(12) United States Patent
Clawson (10) Patent No.: US 6,435,456 B1
(45) Date of Patent: Aug. 20, 2002

(54) MECHANISM FOR RELEASING ARTICLES FROM KITES

(76) Inventor: Bert G. Clawson, 11004 Millington-Arlington Rd., Arlington, TN (US) 38002

( * ) Notice: Subject to any disclaimer, the term of this patent is extended or adjusted under 35 U.S.C. 154(b) by 36 days.

(21) Appl. No.: 09/685,054

(22) Filed: Oct. 10, 2000

(51) Int. Cl.⁷ .............................................. B64C 31/06
(52) U.S. Cl. .............................. 244/155 R; 244/153 R; 244/155 A
(58) Field of Search .................... 244/153 R, 155 A, 244/155 R (56) References Cited

U.S. PATENT DOCUMENTS

| | | | |
|---|---|---|---|
| 3,684,219 A | 8/1972 | King | 244/155 |
| 3,972,496 A | * 8/1976 | Novorr | 244/155 R |
| 4,183,481 A | 1/1980 | Elson | 244/153 |
| RE30,877 E | * 3/1982 | Segerson et al. | 244/155 R |
| 4,465,251 A | 8/1984 | Newbold | 244/155 |
| 4,799,634 A | 1/1989 | Beaulieu | 244/155 |
| 4,842,222 A | 6/1989 | Baird | 244/155 |
| 4,911,383 A | 3/1990 | Elson | 244/153 |
| 5,072,899 A | 12/1991 | Nickle | 244/155 |
| 5,947,420 A | 9/1999 | Backman | 244/155 |

* cited by examiner

*Primary Examiner*—Michael J. Carone
*Assistant Examiner*—Gabriel Sukman
(74) *Attorney, Agent, or Firm*—Walker, McKenzie & Walker, PC (57) ABSTRACT

An object holding and releasing mechanism for use in combination with a kite, a flight string having a first end for being held by the flyer of the kite and having a second end, and an object to be released after being carried aloft by the kite. The object holding and releasing mechanism includes a first member for being attached to the kite; a holding mechanism for holding the object to be released; and a second member for being attached to the second end of the flight string, the second member being hingeably attached to the first member for movement between a closed position in which the object to be released is held by the holding mechanism and a opened position in which the object to be released is released by the holding mechanism, the second member being held in the closed position when the flight string is attached to the second member and is held taut, the second member being free to move to the opened position when the flight string is given slack.

19 Claims, 7 Drawing Sheets

MECHANISM FOR RELEASING ARTICLES FROM KITES

(4) CROSS-REFERENCE TO RELATED APPLICATIONS

Not Applicable.

(5) STATEMENT RE FEDERALLY SPONSORED RESEARCH OR DEVELOPMENT

Not Applicable.

(6) REFERENCE TO A "MICROFICHE APPENDIX"

Not Applicable.

(7) BACKGROUND OF THE INVENTION

1. Field of the Invention

The present invention relates, in general, to mechanisms for holding objects such as parachutes to kites for being carried aloft by the kites, and for subsequently releasing the objects, and, more specifically, to such mechanisms that release the objects when the flight strings of the kites are given slack.

2. Information Disclosure Statement

The following patents appear to be relevant to the present invention:

Backman, U.S. Pat. No. 5,947,420, issued Sep. 7, 1999, discloses a kite accessory release system that drops a variety of objects by increasing tension on the flight string with a jerk.

Nickle, U.S. Pat. No. 5,072,899, issued Dec. 17, 1991, discloses a kite accessory release device with dissolvable member that drops a toy paratrooper by means of a liquid filled gelatin capsule that dissolves after a period of time. The flyer just flies the kite until a chemical reaction releases the object.

Elson, U.S. Pat. 4,911,383, issued Mar. 27, 1990, discloses a flexible pocket that is either made into the keel of a kite or positioned between the keel of a kite and the flight string of that kite for holding a parachute when the flight string is held taut and for releasing the parachute when the flight string is given slack.

Baird, U.S. Pat. 4,842,222, issued Jun. 27, 1989, discloses a kite load-releasing device that drops objects by jerking on a string and activating a pivot, a coupling and a clamping device.

Beaulieu, U.S. Pat. 4,799,634, issued Jan. 24, 1989, discloses hook for releasing a parachute or the like from a kite. The hook is mounted on the tail of the kite and, when the kite achieves a certain flight angle, the objects fall off.

Newbold, U.S. Pat. 4,465,251, issued Aug. 14, 1984, discloses a toy parachute and release mechanism, consisting of an application of the timeless string traveler. Wind blows the parachute and mechanism up the flight string until a tripper of some sort is engaged near the kite to release the parachute.

Segerson et al., U.S. Pat. No. Re. 30,877, issued Mar. 9, 1982 to James M. Segerson and the inventor of the present invention, Bert G. Clawson, discloses a mechanism for releasably attaching a parachute to a kite to allow the parachute to be carried aloft by the kite and to be released while the kite is in flight when the flight string of the kite is given slack. The mechanism includes a spring-like first member fixedly attached to a kite, and a elongated trigger-like second member pivotally attached to the first member and fixedly attached to a flight string. The first member has a catch portion that keeps the second member in a first position until the kite is aloft. Once the kite is aloft, the resistance of the air on the kite will cause the first member to bend sufficient to release the second member from the catch portion. However, the second member will remain in the first position as long as the flight string is held substantially taut. When the flight string is given slack, the second member will pivot to a second position and release the parachute.

Elson, U.S. Pat. 4,183,481, issued Jan. 15, 1980, discloses a parachute dropping kite that carries objects up strapped to the belly of the kite. The strap is pulled off when the flight string is tugged, thereby releasing the object.

King, U.S. Pat. 3,684,219, issued Aug. 15, 1972, discloses a glider launcher for kites. A glider is carried up on the back of a kite, mounted on a rubber-band driven catapult. A tug on the flight string stretches another rubber band enough to trigger the catapult.

Nothing in the known prior art discloses or suggests the present invention. More specifically, nothing in the known prior art discloses or suggests an object holding and releasing mechanism including a first member for being attached to a kite; holding means for holding an object to be released; and a second member for being attached to one end of a flight string, the second member being hingeably attached to the first member for movement between a closed position in which the object to be released is held by the holding means and a opened position in which the object to be released is released by the holding means, the second member being held in the closed position when the flight string is attached to the second member and is held taut, the second member being free to move to the opened position when the flight string is given slack.

(8) BRIEF SUMMARY OF THE INVENTION

The present invention provides an object holding and releasing mechanism for holding objects such as parachutes to kites for being carried aloft by the kites, and for subsequently releasing the objects.

The object holding and releasing mechanism of the present invention comprises, in general, a first member for being attached to a kite; holding means for holding an object to be released; and a second member for being attached to one end of a flight string, the second member being hingeably attached to the first member for movement between a closed position in which the object to be released is held by the holding means and a opened position in which the object to be released is released by the holding means, the second member being held in the closed position when the flight string is attached to the second member and is held taut, the second member being free to move to the opened position when the flight string is given slack.

(10) DETAILED DESCRIPTION OF THE INVENTION

The object holding and releasing mechanism of the present invention is for use in combination with a kite K, a flight string S having a first end FE for being held by the flyer of the kite K and having a second end SE, and one or more articles or objects O, such as a parachutes, seeds, toys, whirligigs, etc., for being released after being carried aloft by the kite K. When the singular "object O to be released" is used hereinafter, it is typically meant to also include the plural "objects O to be released."

The kite K may be any type and construction well known to those skilled in the art. Preferably, the kite K is a typical delta-winged, keel-guided kite having a delta shaped body of plastic film or the like welded or otherwise attached to an elongated center strut forming the backbone of the kite and a pair of elongated side struts extending from the front of the center strut at 45° angles or the like to form the delta shape, and having a delta shaped keel of plastic film or the like welded or otherwise attached to the bottom center of the body with a reinforced hole or the like typically positioned at the bottom point thereof for commonly receiving the second end of a flight string. There are may types of delta-winged kites, etc., which will work with the object holding and releasing mechanism of the present invention.

A first preferred embodiment of the object holding and releasing mechanism of the present invention is shown in FIGS. 1–10, and identified by the numeral 11.

The object holding and releasing mechanism 11 includes a first member 13 for being attached to the kite K; holding means 15 for holding the object O to be released; and a second member 17 for being attached to the second end SE of the flight string S with the second member 17 being hingeably attached to the first member 13 for movement between a closed position (see, in general, FIGS. 1, 2 and 5–8) in which the object O to be released is held by the holding means 15 and a opened position (see, in general, FIGS. 3 and 10) in which the object O to be released is released by the holding means 15, with the second member 17 being held in the closed position when the flight string S is attached to the second member 17 and is held taut, and with the second member 17 being free to move to the opened position when the flight string S is given slack.

The first member 13 preferably includes a box 19 for being attached to the kite K. The box 19 preferably has a first side wall or panel 21, a top wall or panel 23 attached to and extending outward from the first side panel 21 as clearly shown in FIG. 7, a front end 25 attached to and extending outward from the first side panel 21 as clearly shown in FIG. 8, and a rear end 27 attached to and extending outward from the first side panel 21 as clearly shown in FIG. 8 in a manner so that a hollow space or cavity 29 is created therebetween as clearly shown in FIGS. 7 and 8 for receiving the object O to be released and to form or define the holding means 15 for holding the object O to be released. The box 19 may include a second side wall or panel 31 hingeably attached to the top panel 23 for movement between a closed position as clearly shown in FIG. 7 when the flight string S is held taut to cover the cavity 29 to prevent any object O from falling out of the cavity 29, and an opened position as clearly shown in FIG. 10 when the flight string S is given slack. When the second side panel 31 is in the opened position, the bottom edges of the first side panel 21 and second side panel 31 coact to form an open mouth 33 (see, in general, FIG. 10) for allowing ingress into and egress from the cavity 29. The front end 27 may be pointed as clearly shown in FIG. 8 to form a nose and to decrease the wind resistance of the object holding and releasing mechanism 11. Likewise, the rear end 25 and second side panel 31 (when in the closed position) may taper toward the first side panel 21 from the top panel 23 toward the bottom edge of the first side panel 21 so that the box 19 has a generally wedge shape designed to reduce wind resistance.

The second member 17 preferably includes a cover or door 35 for being attached to the second end SE of the flight string S and hingeably attached to the box 19 for movement between a closed position in which the mouth 33 of the box 19 is closed to prevent ingress into and egress from the cavity 29, and an opened position in which the mouth 33 of the box 19 is opened to allow ingress into and egress from the cavity 29. The structure and arrangement of the object holding and releasing mechanism 11 is such that the door 35 is held in the closed position when the flight string S is attached to the door 35 and is held taut, and that the door 35 is free to move to the opened position when the flight string S is given slack. The door 35 is preferably substantially flat and planar with a top edge 37 and a bottom edge 39 hingeably attached to the bottom edge 22 of the first side panel 21 for allowing the door 35 to easily move between the opened and closed positions.

The box 19 and door 35 may be constructed in various manners out of various materials in various sizes and specific designs. Preferably, the box 19 and door 35 are constructed out of a substantially rigid plastic or the like either molded as a one-piece unit with the bottom edge 39 of the door 35 hingeably connected to the bottom edge of the first side panel 21 of the box 19 by a so-called living hinge or the like and with the top edge of the second side panel 31 of the door 35 hingeably connected to the front edge of the top panel 23 of the box 19 by a so-called living hinge or the like, or assembled from individual substantially rigid panels or the like with the edges thereof glued, taped or otherwise attached to form the box 19 and door 35.

The object holding and releasing mechanism 11 preferably includes urging means 41 for forcibly urging the second member 17 (i.e., the door 35) to the opened position. More specifically, the urging means 41 may include weight means 43 attached to the second member 17 (i.e., to the door 35) in a position for forcibly urging the second member 17 (i.e., to the door 35) to the opened position by gravity when the flight string S is given slack. The weight means 41 may consist of any relatively heavy object (as compared to the weight of the door 35) such as a metal disc or the like attached by gluing or the like to the door 35 substantially adjacent the top edge 37 thereof. In addition to or instead of the weight means 43, the urging means 41 may include spring means 45 coupled to the second member 17 (i.e., to the door 35) in a position for forcibly urging the second member 17 (i.e., to the door 35) to the opened position when the flight string S is given slack. The spring means 45 may consist of an elongated flat spring or the like having a first or fixed end 47 attached to a portion of the box 19 and a second or free end 49 positioned so as to engage the door 35 and to normally force the door 35 to the opened position and so that when the door 35 is moved to the closed position and the flight string S is held taut, the door 35 will force the spring means 45 to a distorted, constrained position as clearly shown in FIG. 7.

The object holding and releasing mechanism 11 preferably includes guide means 51 for guiding the second end SE of the flight string S from a point adjacent the nose or front end 25 of the box 19 to the door 35 along a pathway that causes the door 35 to be held in the closed position when the flight string S is attached to the door 35 and is held taut. The guide means 51 preferably includes an elongated, hollow channel or tube 53 extending from a first end 55 adjacent the front end 25 of the box 19 to a second end 57 adjacent the rear end 27 of the box 19. The second end 57 of the tube 39 is preferably flexible to allow it to be normally bent downwardly, away from the top panel 23 for reasons which will hereinafter become apparent. The intermediate portion of the tube 53 may be fixedly attached to the top panel 23 in any manner now apparent to those skilled in the art such as by being glued thereto. The tube 53 could be molded out of plastic as a one-piece unit with the box 19 and door 35 or could consist of a plastic straw or the like glued or otherwise attached to the top panel 23 of the box 19.

Figure 1:
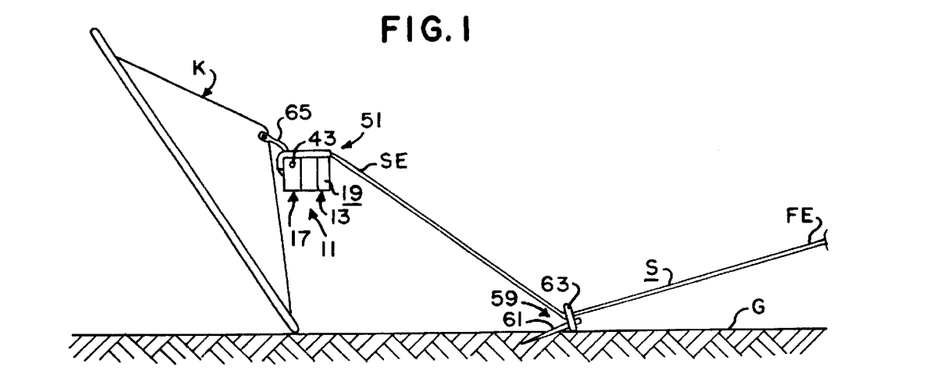
FIG. 1 is a side elevational view of a first preferred embodiment object holding and releasing mechanism of the present invention, shown combined with a kite and a flight string, with the kite resting on the ground in a launch position.
Figure 2:
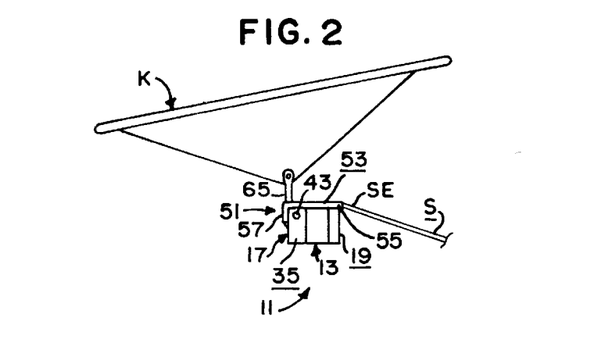
FIG. 2 is a side elevational view of the object holding and releasing mechanism of FIG. 1, showing the kite aloft and with the kite string held taut.
Figure 3:
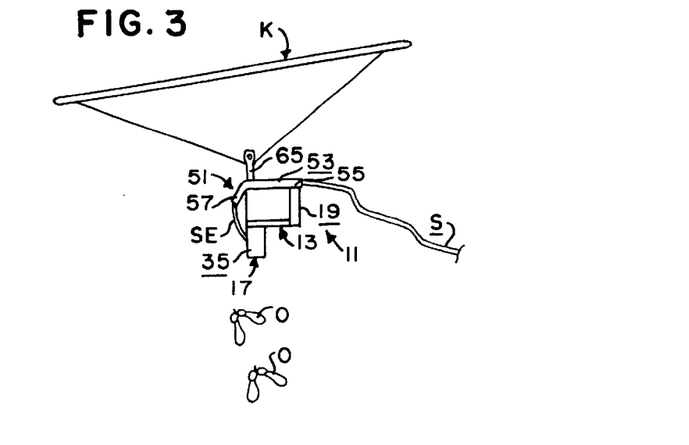
FIG. 3 is a side elevational view of the object holding and releasing mechanism of FIG. 1, showing the kite aloft with the kite string given slack and with objects falling therefrom.
Figure 4:
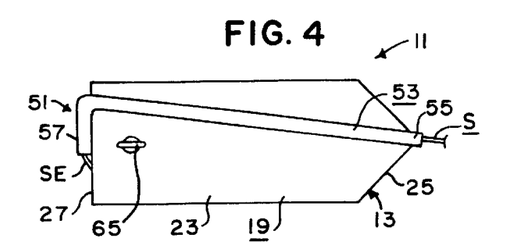
FIG. 4 is a top plan view of the object holding and releasing mechanism of FIG. 1.
Figure 5:
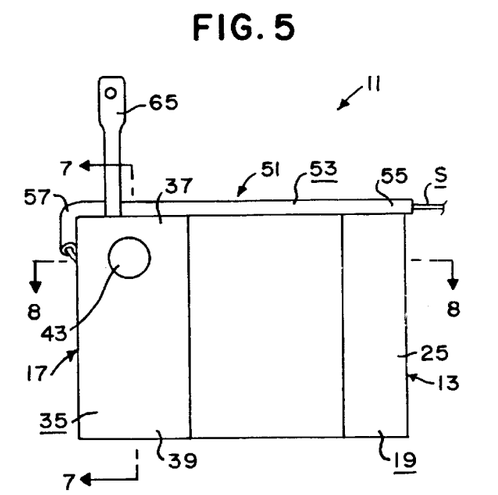
FIG. 5 is a side elevational view of the object holding and releasing mechanism of FIG. 1.
Figure 6:
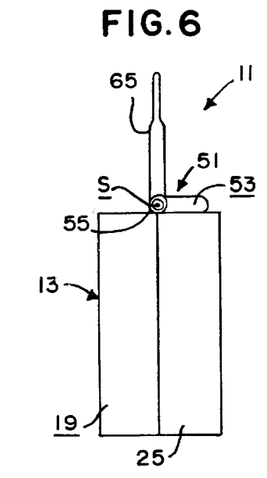
FIG. 6 is a front elevational view of the object holding and releasing mechanism of FIG. 1.
Figure 7:
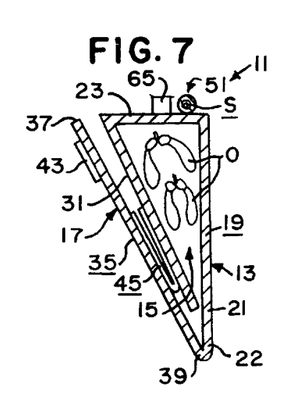
FIG. 7 is a sectional view substantially as taken on line 7—7 of FIG. 5.
Figure 8:
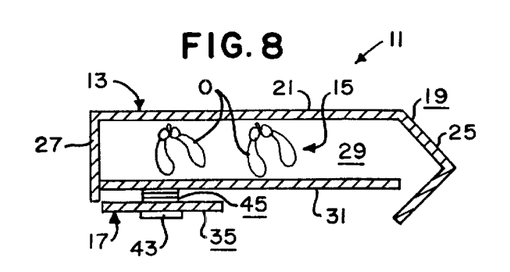
FIG. 8 is a sectional view substantially as taken on line 8—8 of FIG. 5.
Figure 9:
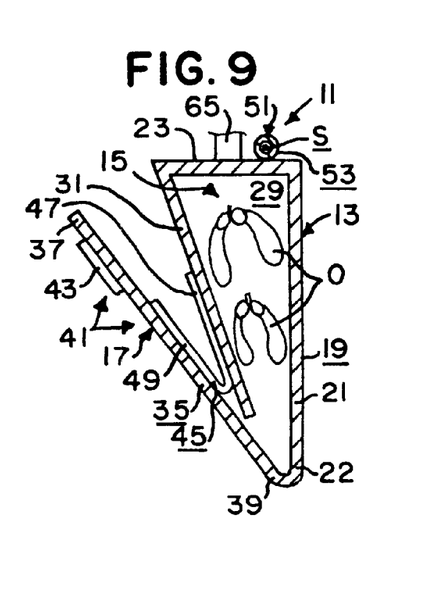
FIG. 9 is a sectional view similar to FIG. 7 but showing the second member thereof in a partially opened position.
Figure 10:
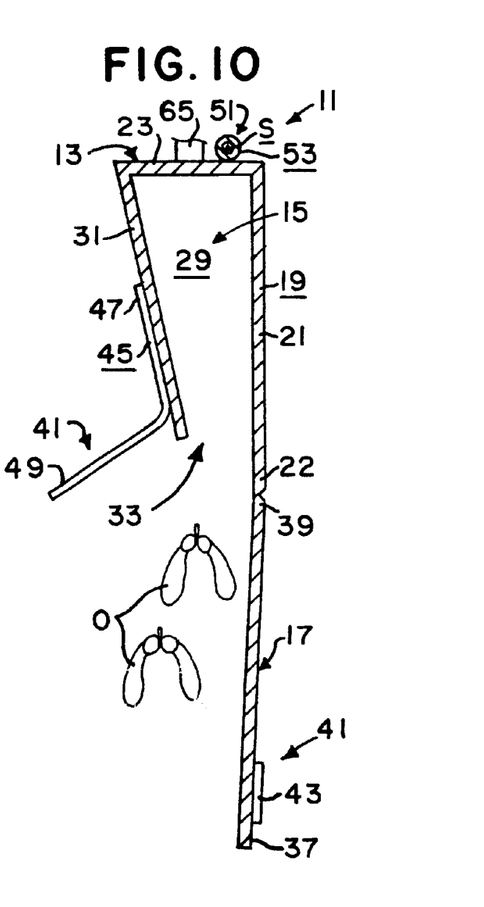
FIG. 10 is a sectional view similar to FIG. 7 but showing the second member thereof in a fully opened position and with objects falling therefrom.

The object holding and releasing mechanism 11 may include an anchor means such as a launch pin 59 attached to the flight string S adjacent the second end SE thereof for anchoring the kite K to the ground G in an upright position at launch as clearly shown in FIG. 1. More specifically, the launch pin 59 preferably includes a nail 61 securely attached to the flight string S approximately 6 to 10 feet (1.8288 to 3.048 meters) from the kite K by way of a tab 63 or the like. The nail 61 is preferably securely attached to the flight string S 8 feet (2.4384 meters) from the kite K. While the nail 61 can be mounted closer to the kite K, it will present less of a jerk to the kite K, the mechanism 11, and the object O at take-off if it is positioned at least 8 feet (2.4384 meters) from the kite K. As clearly shown in FIG. 1, the nail 61 can be struck into the ground G at an angle that allows for an easy pullout at takeoff. This anchoring down of the flight string S accomplishes three things: (1) holds the kite in a substantially upright position (leaning slightly rearwardly as shown in FIG. 1) for launch; (2) provides a stick point for the flight string S so that the flight string S can be properly aligned with the kite K before launch without upsetting the upright position of the kite K (e.g., allows the flyer of the kite K to run to the first end FE of the flight string S and gently pull the flight string S to straighten the flight string S before launch); and (3) creates tension on the flight string S between the launch pin 59 and the kite K when the kite K is positioned upright and leaned backwards to hold the second member 17 in the closed position and keep the object O inside The anchor means may consist simply of a weight member for placement on the ground approximately 8 feet (2.4384 meters) or so in front of the kite K about which the flight string S can be looped prior to take-off to anchor the kite K to the ground G in an upright position at launch. The weight member might be conical so that the flight string S will easily pull off thereof when pulled to launch the kite K.

A second preferred embodiment of the object holding and releasing mechanism of the present invention is shown in FIGS. 11–21, and identified by the numeral 2.11.

The object holding and releasing mechanism 2.11 includes a first member 2.13 for being attached to the kite K; holding means 2.15 for holding the object O to be released; and a second member 2.17 for being attached to the second end SE of the flight string S with the second member 2.17 being hingeably attached to the first member 2.13 for movement between a closed position (see, in general, FIGS. 11, 12, and 14–17 ) in which the object O to be released is held by the holding means 2.15 and a opened position (see, in general, FIGS. 13, 18 and 19) in which the object O to be released is released by the holding means 2.15, with the second member 2.17 being held in the closed position when the flight string S is attached to the second member 2.17 and is held taut, and with the second member 2.17 being free to move to the opened position when the flight string S is given slack.

The first member 2.13 preferably includes a substantially flat panel member 2.19 having a top edge 2.21, a bottom edge 2.23, a first side edge 2.25, and a second side edge 2.27. The bottom edge 2.23 of the panel member 2.19 of the first member 2.13 preferably has a V-shaped notch 2.29 therein.

The second member 2.17 preferably includes a substantially flat panel member 2.31 having a top edge 2.33, a bottom edge 2.35, a first side edge 2.37, and a second side edge 2.39. The bottom edge 2.35 of the panel member 2.31 of the second member 2.17 preferably has a V-shaped notch 2.41 therein. The panel member 2.31 is thus substantially a mirror image of the panel member 2.19.

The object holding and releasing mechanism 2.11 preferably includes hinge means 2.43 for hingeably attaching at least a portion of the first side edge 2.25 of the panel member 2.19 of the first member 2.13 to at least a portion of the first side edge 2.37 of the panel member 2.31 of the second member 2.17.

The panel members 2.19, 2.31 may be constructed in various manners out of various materials in various sizes and specific designs. Preferably, the panel members 2.19, 2.31 are constructed out of a substantially rigid plastic or the like either molded as a one-piece unit with a portion of the first side edge 2.25 of the panel member 2.19 of the first member 2.13 adjacent the top edge 2.21 thereof hingeably connected to a portion of the first side edge 2.37 of the panel member 2.31 of the second member 2.17 adjacent the top edge 2.33 thereof by a so-called living hinge or the like to form the hinge means 2.43, or assembled from individual substantially rigid panels or the like with a portion of the first side edge 2.25 of the panel member 2.19 of the first member 2.13 hingeably attached to a portion of the first side edge 2.37 of the panel member 2.31 of the second member 2.17 by tape, etc., to form the hinge means 2.43.

The holding means 2.15 preferably includes a rod member 2.45 having a first end 2.47 attached to the first member 2.13 and having a second end 2.49 for extending through the object O to be released. The object O to be released preferably has an aperture A therethrough for receiving the second end 2.49 of the rod member 2.45. The rod member 2.45 may be a substantially rigid, nail-like structure constructed out of plastic, metal or the like with an enlarged head at the first end 2.47 and a relatively sharp point at the second end 2.49. The attachment of the first end 2.47 of the rod member 2.45 to the first member 2.15 preferably allows limited movement of the rod member 2.45. For example, the panel member 2.19 of the first member 2.13 preferably has an aperture 2.51 therethrough adjacent the corner between the bottom edge 2.23 and second side edge 2.27 thereof somewhat larger than the diameter of the shaft of the rod member 2.45 for allowing the shaft of the rod member 2.45 to freely pass therethrough. Tabs 2.53 (e.g., push-on type fasteners or the like) may be provided on the rod member 2.45 on either side of the panel member 2.19 to secure the rod member 2.45 to the panel member 2.19. A spacer 2.55 (e.g., a length of a hollow, substantially rigid tube or the like) may be provided between the panel member 2.19 and the tab 2.53 positioned toward the second end 2.49 of the rod member 2.45.

The holding means 2.15 preferably includes a collar member 2.57 attached to the second member 2.17 for receiving the second end 2.49 of the rod member 2.45 when the second member 2.17 is in the closed position to hold the object O to be released on the rod member 2.45 when the second member 2.17 is in the closed position and for releasing the second end 2.49 of the rod member 2.45 when the second member 2.17 is in the opened position to release the object O to be released. The collar member 2.57 may consist of a length of a hollow, substantially rigid tube or the like similar to the spacer 2.55 (e.g., both the spacer 2.55 and collar member 2.57 may be constructed from short pieces of a typical plastic straw or the like). The collar member 2.57 is preferably flexibly attached to the panel member 2.31 of the second member 2.17 adjacent the corner between the bottom edge 2.35 and the second side edge 2.39 thereof to allow limited movement of the collar member 2.57 relative to the second member 2.17. For example, a tab 2.59 may be attached to the collar member 2.57 by glue, tape or the like, and a strap 2.61 may extend through an aperture in the tab 2.59 and be secured to the panel member 2.31 of the second member 2.17 adjacent the corner between the bottom edge 2.35 and the second side edge 2.39 thereof to thereby loosely attach the collar member 2.57 to the second member 2.17 to thereby allow limited movement of the collar member 2.57.

The object holding and releasing mechanism 2.11 preferably includes urging means 2.63 for forcibly urging the second member 2.17 to the opened position. More specifically, the urging means 2.63 may include weight means 2.65 attached to the second member 2.17 in a position for forcibly urging the second member 2.17 to the opened position by gravity when the flight string S is given slack. The weight means 2.65 may consist of any relatively heavy object (as compared to the weight of the panel member 2.31 of the second member 2.17) such as a metal disc or the like attached by gluing or the like to the panel member 2.31 in a location substantially adjacent corner between the top edge 2.33 and second side edge 2.39 thereof. In addition to or instead of the weight means 2.65, the urging means 2.63 may include spring means 2.67 coupled to the second member 2.17 (i.e., to the panel member 2.31) in a position for forcibly urging the second member 2.17 (i.e., to the panel member 2.31) to the opened position when the flight string S is given slack. The spring means 2.67 may consist of an elongated flat spring or the like having a first end 2.69 attached to a portion of the first member 2.13 (i.e., to the panel member 2.19) and a second end 2.71 attached to a portion of the second member 2.17 (i.e., to the panel member 2.31) for normally forcing the second side edges 2.27, 2.39 of the panel members 2.19, 2.31, respectively, away from one another to thereby move the second member 2.17 to the opened position, and so that when the second member 2.17 is moved to the closed position and the flight string S is held taut, the spring means 2.67 will be held in a distorted, constrained position as clearly shown in FIG. 17.

The object holding and releasing mechanism 2.11 preferably includes guide means 2.73 for guiding the second end SE of the flight string S from a point adjacent the first side edge 2.25 of the panel member 2.19 of the first member 2.13 to a point adjacent the second side edge 2.27 of the panel member 2.19 of the first member 2.13 along a pathway that causes the second member 2.17 to be held in the closed position when the flight string S is attached to the panel member 2.31 of the second member 2.17 and is held taut. The guide means 2.73 preferably includes an elongated, hollow channel 2.75 extending from a first end 2.77 adjacent the first side edge 2.25 of the panel member 2.19 of the first member 2.13 to a second end 2.79 adjacent the second side edge 2.27 of the panel member 2.19 of the first member 2.13.

The second end 2.79 of the tube 2.75 is preferably flexible to allow it to be normally bent in a right angle for reasons which will hereinafter become apparent. The intermediate portion of the tube 2.75 may be fixedly attached adjacent the top edge 2.33 of the panel member 2.19 in any manner now apparent to those skilled in the art such as by being glued thereto. The tube 2.75 could be molded out of plastic as a one-piece unit with the panel member 2.19 or could consist of a plastic straw or the like glued or otherwise fixedly attached adjacent the top edge 2.33 of the panel member 2.19.

A modified version of the object holding and releasing mechanism 2.11 is shown in FIGS. 22–26, and identified by the numeral 2.11'. The object holding and releasing mechanism 2.11' is similar to the object holding and releasing mechanism 2.11 and like or similar elements and parts of the object holding and releasing mechanism 2.11' will be identified herein and in the drawings with reference numerals corresponding to the reference numbers used herein for the object holding and releasing mechanism 2.11 with a prime suffix (i.e., "'")to emphasize the similarity with corresponding elements of the object holding and releasing mechanism 2.11. In general, the object holding and releasing mechanism 2.11' includes a first member 2.13', holding means 2.15', and a second member 2.17' all having the same basic function and operation as the like components of the object holding and releasing mechanism 2.11. The holding means 2.15' is preferably identical in structure and construction to the holding means 2.15 of the object holding and releasing mechanism 2.11. However, the first and second members 2.13', 2.17' are preferably substantially smaller in height that the first and second members 2.13, 2.17 of the object holding and releasing mechanism 2.11 and do not include the V-shaped notches, etc. The object holding and releasing mechanism 2.11' preferably includes guide means 2.73' similar to the guide means 2.73 of the object holding and releasing mechanism 2.11 with the exception that the hollow channel 2.75' of the guide means 2.73' extends only a fraction of the distance from the first side edge 2.25' of the panel member 2.19' of the first member 2.13' (e.g., approximately 1 inch or 2.54 centimeters). The second end 2.79' of the hollow channel 2.75' is preferably bent in at a right angle to thereby guide the second end SE of the flight string S to the second member 2.17 at a point directly opposite the point where the second end SE of the flight string S is anchored to the second member 2.17 when the first and second members 2.13', 2.17' are in the closed position. The advantage of this modified version of the object holding and releasing mechanism with the hollow channel 2.75' of the guide means 2.73' extending only a fraction of the distance from the first side edge 2.25' of the panel member 2.19' of the first member 2.13' (e.g., approximately 1 inch or 2.54 centimeters) and with the second end SE of the flight string S attached directly opposite the second end 2.79' of the hollow channel 2.75' when the first and second members 2.13', 2.17' are in the closed position, is that when the flight string S is given slack, the mechanism 2.11' responds faster and more efficiently because the weight means 2.65' to forcibly urge the first and second members 2.13', 2.17' to the opened position is more effective because the second end SE of the flight string S is attached closer to the hinge 2.43' (the weight means 2.65', urging open the hinge 2.43', is further away from the fulcrum point of the hinge 2.43' that the restraining string—i.e., the second end SE of the flight string S- so that the weigh means 2.65' is used more effectively) thereby requiring less string to travel through the hollow channel 2.75 and allowing for a quicker reaction when the flight string S is given slack.

Figure 11:
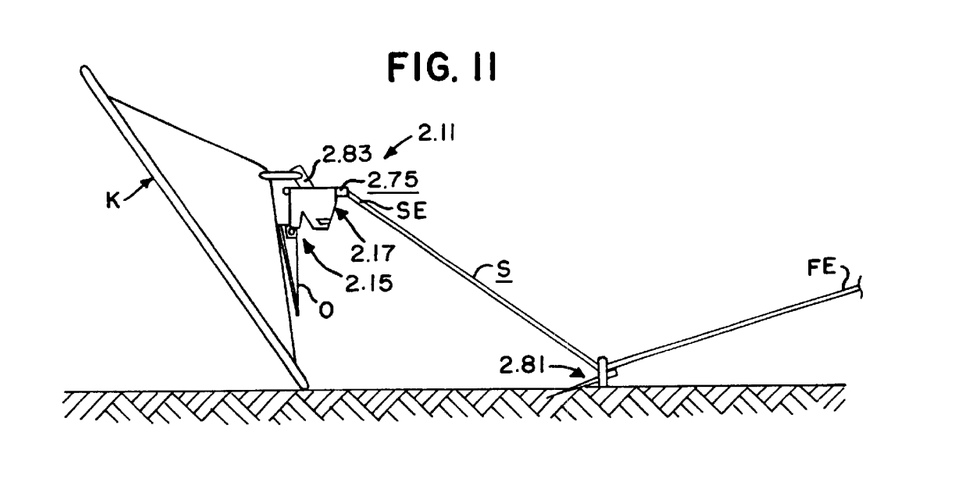
FIG. 11 is a side elevational view of a second preferred embodiment object holding and releasing mechanism of the present invention, shown combined with a kite and a flight string, with the kite resting on the ground in a launch position.
Figure 12:
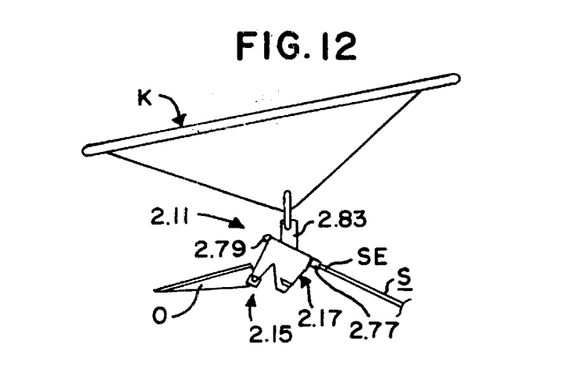
FIG. 12 is a side elevational view of the object holding and releasing mechanism of FIG. 11, showing the kite aloft and with the kite string held taut.
Figure 13:
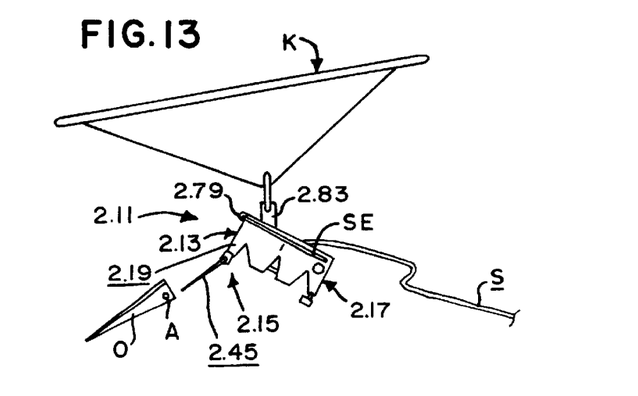
FIG. 13 is a side elevational view of the object holding and releasing mechanism of FIG. 11, showing the kite aloft with the kite string given slack and with objects falling therefrom.
Figure 14:
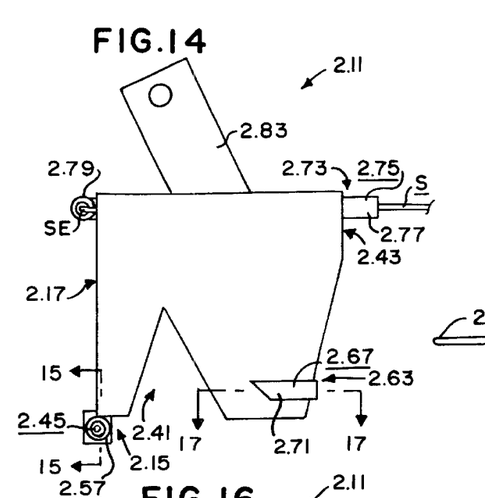
FIG. 14 is a side elevational view of the object holding and releasing mechanism of FIG. 11, shown with the second member thereof in a closed position.
Figure 15:
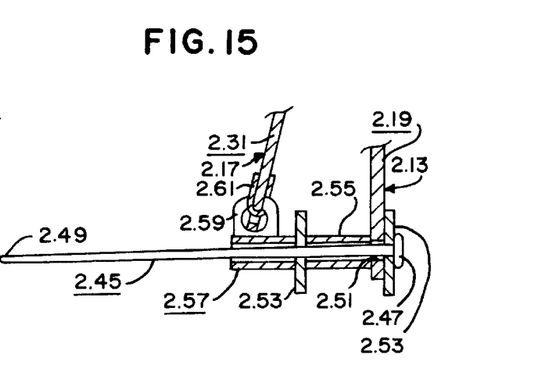
FIG. 15 is a sectional view substantially as taken on line 15—15 of FIG. 14, on a somewhat enlarged scale.
Figures 16, 17, 18:
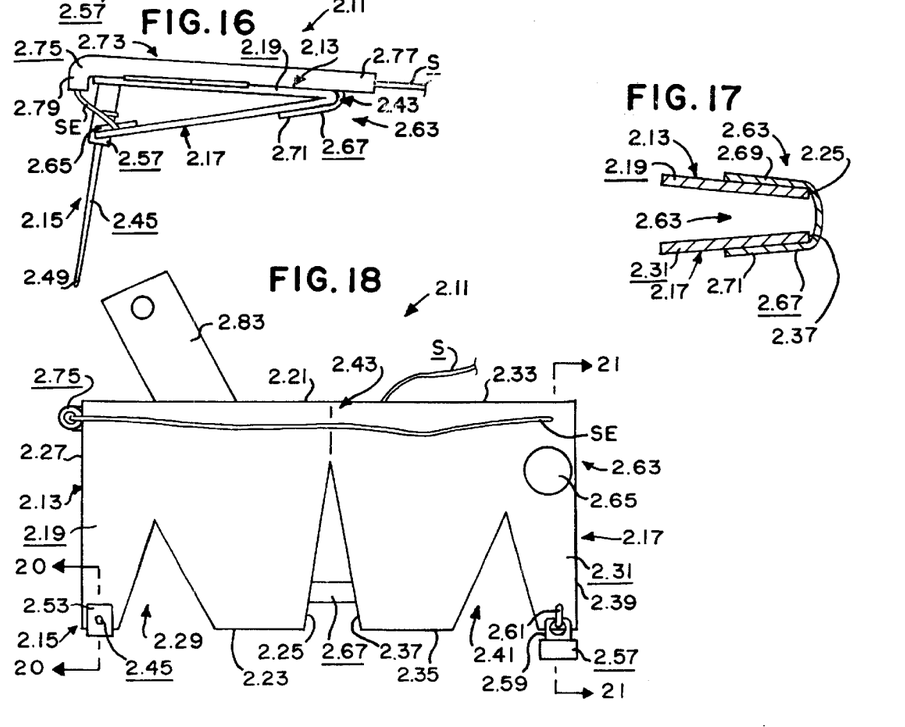
FIG. 16 is a top plan view of the object holding and releasing mechanism of FIG. 11, shown with the second member thereof in a closed position.
FIG. 17 is a sectional view substantially as taken on line 17—17 of FIG. 14, on a somewhat enlarged scale.
FIG. 18 is side elevational view of the object holding and releasing mechanism of FIG. 11, shown with the second member thereof in an opened position.
Figure 19:
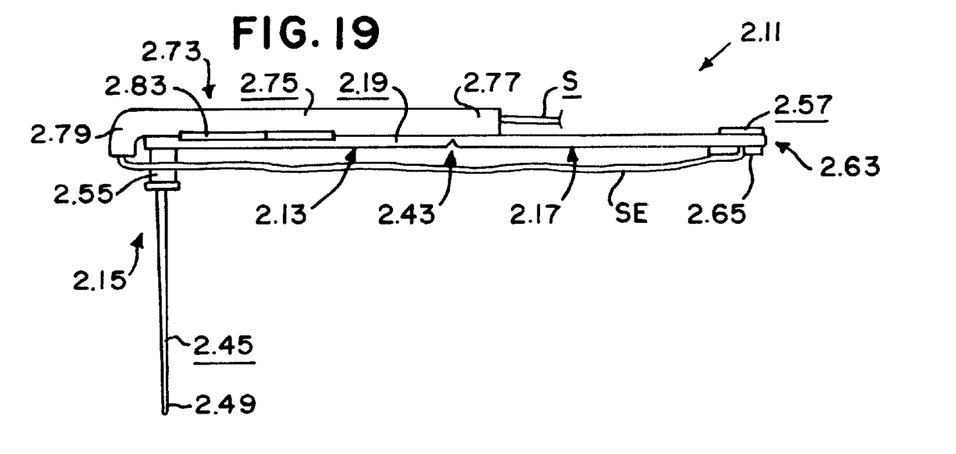
FIG. 19 is a top plan view of the object holding and releasing mechanism of FIG. 11, shown with the second member thereof in an opened position.
Figure 20:
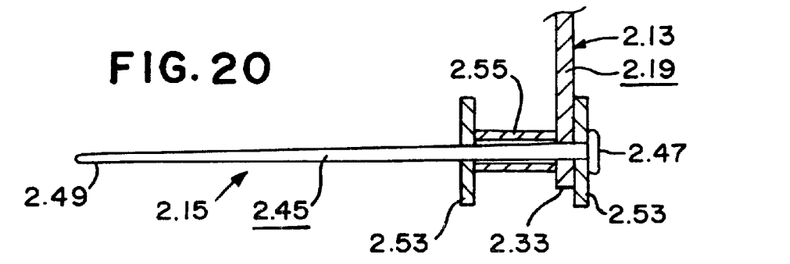
FIG. 20 is a sectional view substantially as taken on line 20—20 of FIG. 18, on a somewhat enlarged scale.
Figure 21:
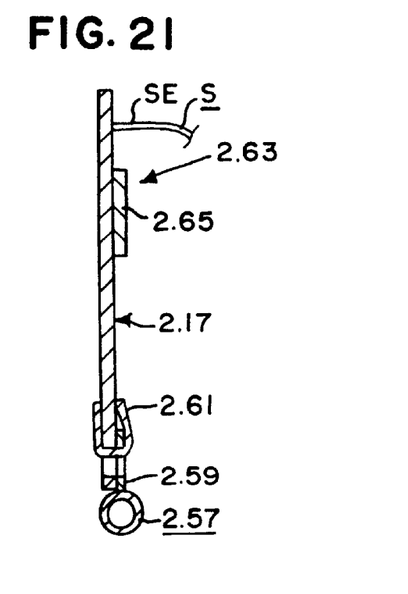
FIG. 21 is a sectional view substantially as taken on line 21—21 of FIG. 18, on a somewhat enlarged scale.
Figure 22:
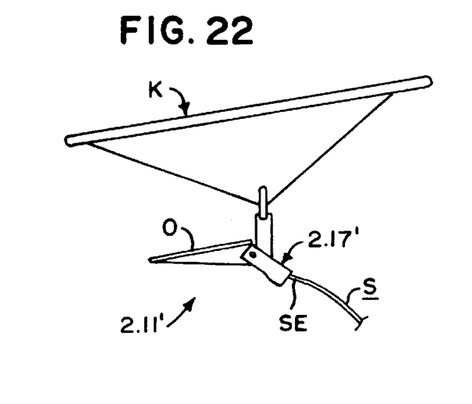
FIG. 22 is a side elevational view of a modified version of the second preferred embodiment object holding and releasing mechanism of the present invention, shown combined with a kite and a flight string, showing the kite aloft and with the kite string held taut.
Figure 23:
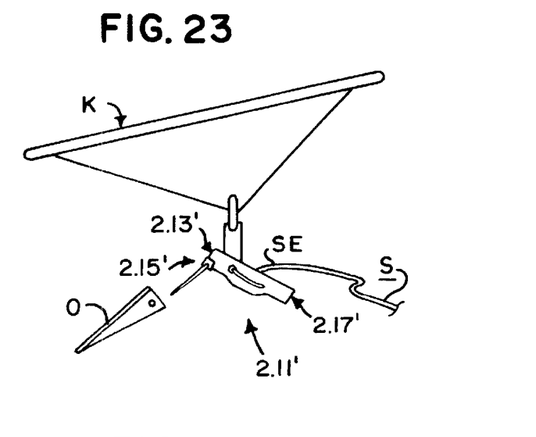
FIG. 23 is a side elevational view of the modified version of the object holding and releasing mechanism of FIG. 22, showing the kite aloft with the kite string given slack and with objects falling therefrom.
Figure 24:
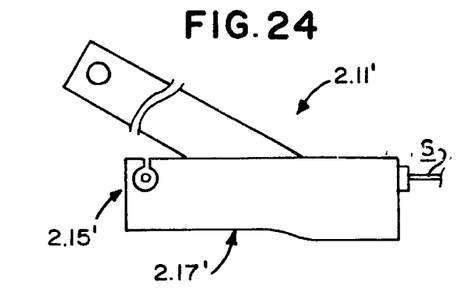
FIG. 24 is a side elevational view of the object holding and releasing mechanism of FIG. 22, shown with the second member thereof in a closed position.
Figure 25:
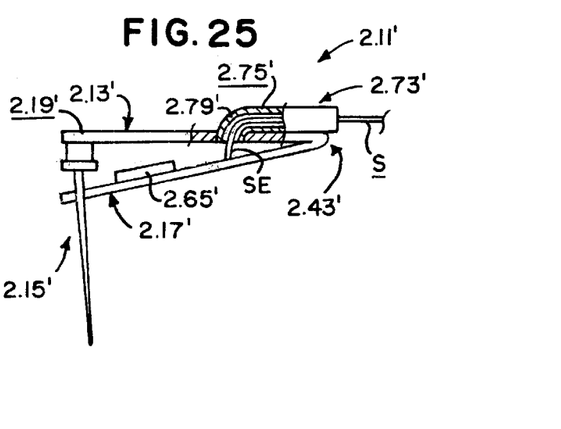
FIG. 25 is a top plan view of the object holding and releasing mechanism of FIG. 22, shown with the second member thereof in a closed position and with portions thereof broken away for clarity.
Figure 26:
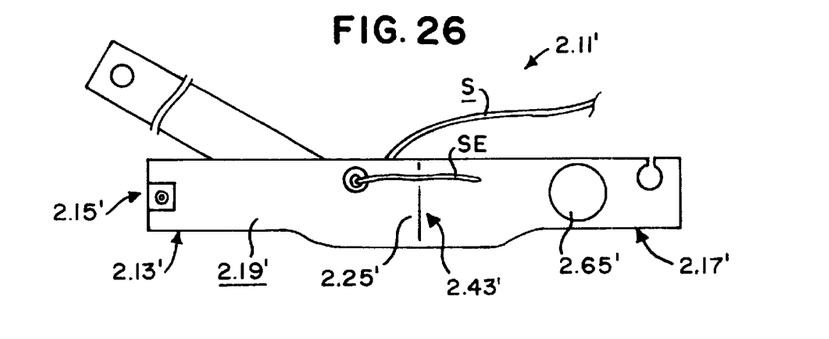
FIG. 26 is side elevational view of the object holding and releasing mechanism of FIG. 22, shown with the second member thereof in an opened position.

The object holding and releasing mechanism 2.11 may include an anchor means such as a launch pin 2.81 attached to the flight string S adjacent the second end SE thereof for anchoring the kite K to the ground G in an upright position at launch as clearly shown in FIG. 11. The launch pin 2.81 is preferably identical in structure, function and operation to the launch pin 59 hereinabove disclosed relative to the object holding and releasing mechanism 11, and reference should be made to the above disclosure of the launch pin 59 for a full disclosure and understanding of the launch pin 2.81.

The operation of the first and second embodiments of the object holding and releasing mechanism 11, 2.11 are substantially similar and are substantially as follows: The respective mechanism 11, 2.11 is attached to the kite K, preferably at the lowest point of the keel of the kite K as clearly shown in FIGS. 1–3 and 11–13. The mechanism 11 may include a flexible post or strap 65 extending from the box 19 for being secured by a rivet, clamp or the like to the keel of the kite K. The mechanism 2.11 may include a flexible strap 2.83 extending from the panel member 2.19 of the first member 2.13 for being secured by a rivet, clamp or the like to the keel of the kite K.

To load and launch the kite K with the mechanism 11, the object O is inserted into the cavity 29 and the door 35 is manually moved to the closed position to trap the object O within the cavity 29. With the door 35 held in the closed position, the second end SE of the flight string S is held taut from a location adjacent the launch pin 59. The launch pin 59 can then be inserted into the ground G and the kite K can be stood up on its end and leaned backwards as clearly shown in FIG. 1 to create tension on the portion of the flight string S between the second end SE thereof and the launch pin 59 sufficient to hold the door 35 in the closed position. The flyer of the kite K can then grasp the first end FE of the flight string S, straighten and align the flight string S to form a relatively straight line between the first end FE thereof and the launch pin 59, and then run or pull the first end FE of the flight string S in a direction away from the kite K so that the launch pin 59 will be pulled out of the ground G and the kite K will rock to an upright position and then become airborne while sufficient tension remains on the flight string S to hold the door 35 in the closed position. At any time after the kite K is airborne, the flyer thereof can merely give the flight string S slack, causing the urging means 41 to forcibly urge the door 35 to the opened position, allowing the object O to fall from the cavity 29.

To load and launch the kite K with the mechanism 2.11, the second end 2.49 of the rod member 2.45 is inserted through the aperture A in the object O and through the collar member 2.57, and the second member 2.17 is manually moved to the closed position to trap the object O on the rod 2.45. With the second member 2.17 held in the closed position, the second end SE of the flight string S is held taut from a location adjacent the launch pin 2.81. The launch pin 2.81 can then be inserted into the ground G and the kite K can be stood up on its end and leaned backwards as clearly shown in FIG. 11 to create tension on the portion of the flight string S between the second end SE thereof and the launch pin 2.81 sufficient to hold the second member 2.17 in the closed position. The flyer of the kite K can then grasp the first end FE of the flight string S, straighten and align the flight string S to form a relatively straight line between the first end FE thereof and the launch pin 2.81, and then run or pull the first end FE of the flight string S in a direction away from the kite K so that the launch pin 2.81 will be pulled out of the ground G and the kite K will rock to an upright position and then become airborne while sufficient tension remains on the flight string S to hold the second member 2.17 in the closed position. At any time after the kite K is airborne, the flyer thereof can merely give the flight string S slack, causing the urging means 2.63 to forcibly urge the second member 2.17 to the opened position, allowing the object O to fall off the rod member 2.45.

Although the present invention has been described and illustrated with respect to a preferred embodiment and a preferred use therefor, it is not to be so limited since modifications and changes can be made therein which are within the full intended scope of the invention.

What is claimed is:

1. An object holding and releasing mechanism for use in combination with a kite, a flight string having a first end for being held by the flyer of the kite and having a second end, and an object to be released after being carried aloft by the kite;

said object holding and releasing mechanism comprising:
    (a) a first member for being attached to the kite;
    (b) holding means for holding the object to be released; and
    (c) a second member for being attached to the second end of the flight string, said second member being hingeably attached to said first member for movement between a closed position in which the object to be released is held by said holding means and a opened position in which the object to be released is released by said holding means, said second member being held in said closed position when the flight string is attached to said second member and is held taut, said second member being free to move to said opened position when the flight string is given slack; said first member including a box for being attached to the kite; said box having a cavity forming said holding means for holding the object; said box having a mouth for allowing ingress into and egress from said cavity;
    said second member including a cover for being attached to the second end of the flight string and hingeably attached to said box for movement between a closed position in which said mouth of said box is closed to prevent ingress into and egress from said cavity, and an opened position in which said mouth of said box is opened to allow ingress into and egress from said cavity, said cover being held in said closed position when the flight string is attached to said cover and is held taut, said cover being free to move to said opened position when the flight string is given slack.

2. An object holding and releasing mechanism for use in combination with a kite, a flight string having a first end for being held by the flyer of the kite and having a second end, and an object to be released after being carried aloft by the kite;

said object holding and releasing mechanism comprising:
    (a) a first member for being attached to the kite;
    (b) holding means for holding the object to be released;
    (c) a second member for being attached to the second end of the flight string, said second member being hingeably attached to said first member for movement between a closed position in which the object to be released is held by said holding means and a opened position in which the object to be released is released by said holding means, said second member being held in said closed position when the flight string is attached to said second member and is held taut, said second member being free to move to said opened position when the flight string is given slack; and
    (d) urging means for forcibly urging said second member to the opened position; said urging means including weight means attached to said second member in a position for forcibly urging said second member to the opened position by gravity when the flight string is given slack.

3. An object holding and releasing mechanism for use in combination with a kite, a flight string having a first end for being held by the flyer of the kite and having a second end, and an object to be released after being carried aloft by the kite;

said object holding and releasing mechanism comprising:
    (a) a first member for being attached to the kite;
    (b) holding means for holding the object to be released:
    (c) a second member for being attached to the second end of the flight string, said second member being hingeably attached to said first member for movement between a closed position in which the object to be released is held by said holding means and a opened position in which the object to be released is released by said holding means, said second member being held in said closed position when the flight string is attached to said second member and is held taut, said second member being free to move to said opened position when the flight string is given slack; and
    (d) urging means for forcibly urging said second member to the opened position; said urging means including spring means coupled to said second member in a position for forcibly urging said second member to the opened position when the flight string is given slack.

4. The object holding and releasing mechanism of claim 1 in which said box has a nose; and in which is included guide means for guiding the second end of the flight string from a point adjacent said nose of said box to said cover of said second member along a pathway that causes said cover to be held in the closed position when the flight string is attached to said cover and is held taut.

5. The object holding and releasing mechanism of claim 4 in which said box has a rear; and in which said guide means includes an elongated, hollow channel extending from a first end adjacent said nose of said box to a second end adjacent said rear of said box.

6. The object holding and releasing mechanism of claim 5 in which said second end of said channel is flexible.

7. The object holding and releasing mechanism of claim 1 in which said box has a wedge shape designed to reduce wind resistance and includes a first side panel, a top panel attached to and extending outward from said first side panel, a front end attached to and extending outward from said first side panel, and a rear end attached to and extending outward from said first side panel so that a hollow cavity is created therebetween for receiving the object to be released and to form said holding means for holding the object to be released.

8. The object holding and releasing mechanism of claim 7 in which said box includes a second side panel hingeably attached to said top panel for movement between a closed position when the flight string is held taut to cover said cavity to prevent the object from falling out of said cavity, and an opened position when the flight string is given slack.

9. The object holding and releasing mechanism of claim 8 in which said cover of said second member is hingeably attached to said first side panel of said box.

10. An object holding and releasing mechanism for use in combination with a kite, a flight string having a first end for being held by the flyer of the kite and having a second end, and an object to be released after being carried aloft by the kite;
 said object holding and releasing mechanism comprising:
 (a) a first member for being attached to the kite;
 (b) holding means for holding the object to be released: and
 (c) a second member for being attached to the second end of the flight string, said second member being hingeably attached to said first member for movement between a closed position in which the object to be released is held by said holding means and a opened position in which the object to be released is released by said holding means, said second member being held in said closed position when the flight string is attached to said second member and is held taut, said second member being free to move to said opened position when the flight string is given slack;
 said holding means including a rod member having a first end attached to said first member and having a second end for extending through the object to be released;
 said holding means including a collar member attached to said second member for receiving said second end of said rod member when said second member is in said closed position to hold the object to be released on said rod member when said second member is in said closed position and for releasing said second end of said rod member when said second member is in said opened position to release the object to be released.

11. The object holding and releasing mechanism of claim 10 in which is included urging means for forcibly urging said second member to the opened position.

12. The object holding and releasing mechanism of claim 11 in which said urging means includes weight means attached to said second member in a position for forcibly urging said second member to the opened position by gravity when the flight string is given slack.

13. The object holding and releasing mechanism of claim 11 in which said urging means includes spring means coupled to said second member in a position for forcibly urging said second member to the opened position when the flight string is given slack.

14. The object holding and releasing mechanism of claim 11 in which said first member includes a panel member having a top edge, a bottom edge, a first side edge, and a second side edge; in which said second member includes a panel member having a top edge, a bottom edge, a first side edge, and a second side edge; in which at least a portion of said first side edge of said panel member of said first member is hingeably attached to at least a portion of said first side edge of said panel member of said second member.

15. The object holding and releasing mechanism of claim 14 in which said bottom edge of said panel member of said first member has a V-shaped notch therein; and in which said bottom edge of said panel member of said second member has a V-shaped notch therein.

16. The object holding and releasing mechanism of claim 14 in which is included guide means for guiding the second end of the flight string from a point adjacent said first side edge of said panel member of said first member to a point adjacent said second side edge of said panel member of said first member along a pathway that causes said second member to be held in the closed position when the flight string is attached to said panel member of said second member and is held taut.

17. The object holding and releasing mechanism of claim 16 in which said guide means includes an elongated, hollow channel extending from a first end adjacent said first side edge of said panel member of said first member to a second end adjacent said second side edge of said panel member of said first member.

18. An object holding and releasing mechanism for use in combination with a kite, a flight string having a first end for being held by the flyer of the kite and having a second end, and an object to be released after being carried aloft by the kite;
 said object holding and releasing mechanism comprising:
 (a) a first member for being attached to the kite;
 (b) holding means for holding the object to be released;
 (c) a second member for being attached to the second end of the flight string, said second member being hingeably attached to said first member for movement between a closed position in which the object to be released is held by said holding means and a opened position in which the object to be released is released by said holding means, said second member being held in said closed position when the flight string is attached to said second member and is held taut, said second member being free to move to said opened position when the flight string is given slack; and
 (d) anchor means for being attached to the flight string adjacent the second end thereof for allowing the kite to be anchored to the ground in an upright position at launch.

19. An object holding and releasing mechanism for use in combination with a kite, a flight string having a first end for being held by the flyer of the kite and having a second end, and an object to be released after being carried aloft by the kite; said object holding and releasing mechanism comprising:
 (a) a first member for being attached to the kite;
 (b) holding means for holding the object to be released: and
 (c) a second member for being attached to the second end of the flight string, said second member being hingeably attached to said first member for movement between a closed position in which the object to be released is held by said holding means and a opened position in which the object to be released is released by said holding means, said second member being held in said closed position when the flight string is attached to said second member and is held taut, said second member being free to move to said opened position when the flight string is given slack;
 said holding means including a rod member having a first end attached to said first member and having a second end for extending through the object to be released;
 said holding means including means for receiving said second end of said rod member when said second member is in said closed position to hold the object to be released on said rod member when said second member is in said closed position and for releasing said second end of said rod member when said second member is in said opened position to release the object to be released.

* * * * *